April 23, 1940.　　　P. E. KÖSTER　　　2,197,890

FLIGHT CONTROL DEVICE, MORE PARTICULARLY FOR FAST AIRCRAFT

Filed April 2, 1938　　　2 Sheets-Sheet 1

Paul E. Köster
Inventor by Stephen Comstock
Atty.

Patented Apr. 23, 1940

2,197,890

UNITED STATES PATENT OFFICE

2,197,890

FLIGHT CONTROL DEVICE, MORE PARTICULARLY FOR FAST AIRCRAFT

Paul Eduard Köster, Berlin-Siemensstadt, Germany, assignor to Siemens Apparate und Maschinen Gesellschaft mit beschränkter Haftung, Berlin, Germany, a corporation of Germany Application April 2, 1938, Serial No. 199,725
In Germany April 3, 1937

2 Claims. (Cl. 33—204)

The present invention relates to a flight surveying instrument to be used more particularly for high speed airplanes and comprising a device for indicating the side inclination. The side inclination is determined by a gyroscopic horizon as well as by a physical pendulum, for instance a ball level. Such a double indication of the side inclination has, besides the possibility of the mutual control, the advantage that the true side inclination of the airplane, which effectively exists, is known through the gyroscopic horizon, which is not subjected to accelerations of short duration and, accordingly, always remains in the vertical line, while it is possible to control the side inclination which is necessary for the flying condition at a given moment according to a physical pendulum, which is dependent on the acceleration, as it is well known, and accordingly takes a position in the apparent vertical line.

However, the experience in blind flying with the modern high speed airplanes has shown that the ball level or another physical pendulum is no longer sufficient for maintaining a correct side inclination. The reason for this is that every slope error principally causes a side acceleration until a stationary slip condition has been attained. Low speed airplanes with high and sharp edged frames permit only of small slip angles which are attained after a short time of acceleration. Modern airplanes with rounded frames and flowing transitions between the frame and the wing attain slip angles which are very much higher because of their small keel proportions and accordingly also longer times of acceleration.

This is more particularly true for the maintenance of a correct side inclination during the flight in curves. In this case, the side accelerations exert their action in the same manner, that is to say that so long as the airplane is subjected to a side acceleration, the ball level cannot be used as an indicating instrument, for it can always remain in the middle in spite of a strong slope error. It is only in the condition without side acceleration that it can be used again.

On the other hand, high speed airplanes require in blind flight at least the same and for directional flight even still higher turning speeds than low speed planes. To-day, for a blind flight, a minimum turning speed of 2° per second is required. In certain cases, turning speeds of 3–4° per second are already required. Now, while a low speed airplane having a speed of 180 kilometers per hour requires side inclinations of 10–20° for the required range of turning speeds of 2–4° per second, high speed airplanes with a speed of 360–540 kilometers per hour already require side inclinations of 20–45° for the same turning speed. For these reasons, with high speed airplanes, an exact variation of course is possible only with the control of the corresponding side inclination. If the rudder is actuated alone without the aileron, the airplane will change its course, indeed, but it will first maintain the path of its center of gravity until a side inclination gradually occurs. Then, the airplane swings towards the other side in spite of the straight position of the vertical rudder while maintaining its side inclination and it is subjected to a new side acceleration, so that a coupled oscillation about the vertical and the longitudinal axes occurs. But such a behaviour in turns is not admissible for blind flight and for directional flight.

The invention has for its object to do away with these disadvantages, and this is obtained by adjoining to the reading indicator of the gyroscopic horizon which indicates the effective side inclination, a counter-indicator which can be automatically actuated in function of a device which determines the intended side inclination.

The invention will be described now with reference to the embodiment which is shown by way of example in the drawings. In this embodiment, the invention is applied to a flight surveying instrument the casing of which contains, besides the indicator devices for the longitudinal and the side inclinations, also a turn indicator to the reading pointer of which a counter-pointer, movable in function of a course indicator, is adjoined.

Figure 1:
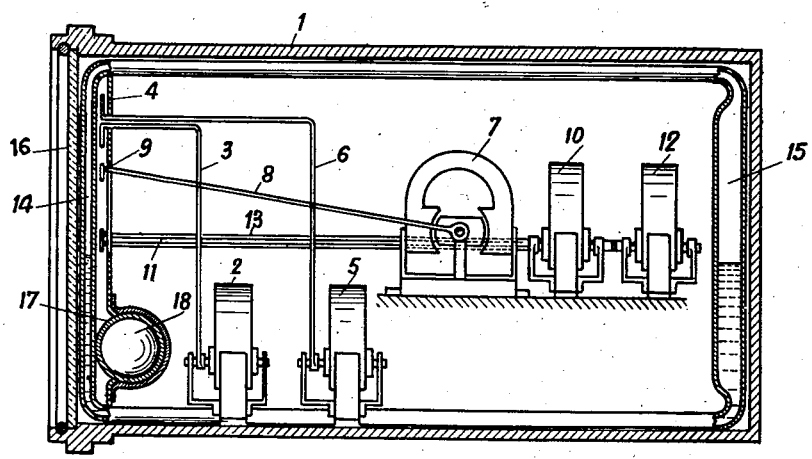
Figure 1 is a longitudinal sectional view of the flight surveying instrument.

In a casing 1 in which the measuring mechanisms are located, 2 is a rotative magnet system which transmits to a reading pointer 3 the movements of rotation imparted to it and effected by the airplane about its vertical axis. The reading pointer 3 is twice bent at a right angle and moves with its free end over a scale disc 4. A counter-pointer 6 adjacent the reading pointer 3 is movable in function of a rotative magnet system 5 and shows the deviations of the airplane from its prescribed course. It is guided through a double bend at right angles so that it moves with its free end over the scale disc 4 and registers with the free end of the reading pointer 3 and is over this end in the zero position. The pivots of both pointers 3 and 6 are in the same axis. 7 is also a rotative magnet system moving a reading pointer 8 according to the movements of the airplane about the transverse axis. The free end of the reading pointer 8 is formed as an airplane phantom 9. For the sake of clearness, the reading pointer 8 is shown in the operative position in Figure 1. A rotative magnet system 10 indicates through a reading pointer 11 the movements of the airplane about its longitudinal axis. The reading pointer is forked and guided through bends at right angles so that both its free ends move over the scale disc 4 and are aligned with the airplane phantom 9 in the zero position. Finally, 12 is also a rotative magnet system which actuates a reading pointer 13 according to the intended side inclinations which are necessary for the flying condition of the moment. This reading pointer is also forked and guided through bends at right angles so that it embraces the reading pointer 11 in such a manner that both free ends moving over the scale disc 4 are adjoined to the free ends of the reading pointer 11 as a counter-pointer. A longitudinal inclination indicator 14, filled with a suitable fluid such as coloured alcohol, surrounds in the form of a ring the chamber adapted for receiving the inclination indicator or passes through this chamber and is enlarged at 15 in the form of a vessel. The measuring leg of the longitudinal inclination indicator 14 extends through the chamber between the scale disc 4 and a common sight disc 16. Simultaneously, the sight disc 16 closes the casing 1. For indicating the side inclination, a level 17 is provided in which a ball 18 can move. The level 17 is arranged transversely of the measuring leg of the longitudinal inclination indicator 14 immediately behind the latter.

Figure 2:
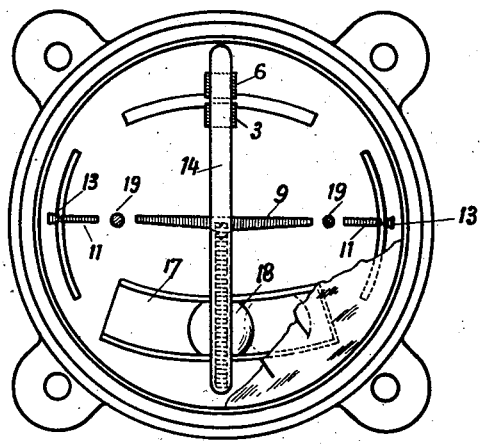
Figure 2 is a front view of the flight surveying instrument.

In Figure 2, a front view of the flight surveying instrument is shown, the arrangement of the reading pointers and of the measuring instruments themselves being such that it is possible to read all the measured values in the same visual field. The measuring leg of the fluid inclination indicator 14 extends transversely of the level 17 and coincides with the reading pointers 3 and 6 in their zero position. In the zero position, the reading pointer 11, the free end of the reading pointer 8 which is formed as an airplane phantom 9 as well as the reading pointer 13, are on an axis which is perpendicular to the measuring leg of the fluid inclination indicator 14, preferably about the middle of the same. Marks 19 provided on the scale disc 4 serve to indicate the zero position for the reading pointers 9, 11 and 13. The fluid charge of the longitudinal inclination indicator 14 is preferably calculated so that the level of the fluid in the measuring leg in the zero position is on the horizontal axis of the airplane phantom 9.

Figure 3:
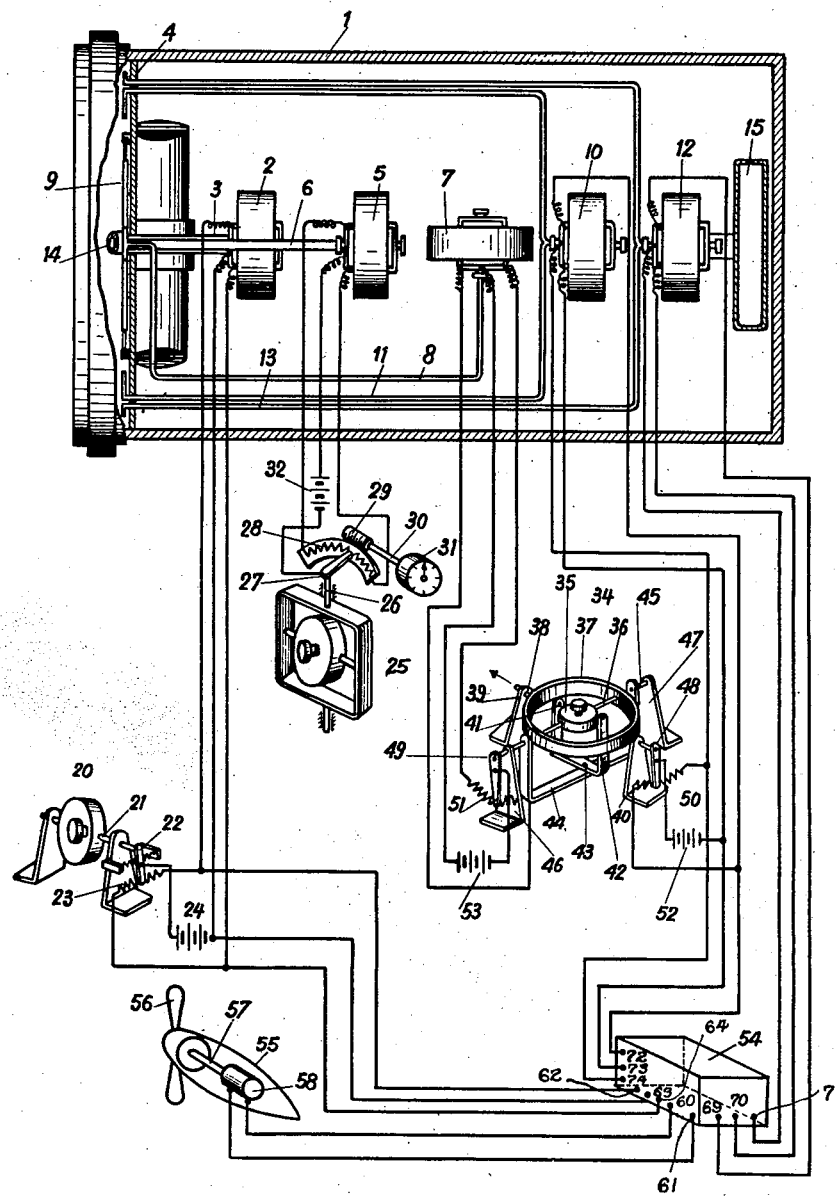
Figure 3 is a plan view of the flight surveying instrument, the casing being partially omitted, and a diagrammatical view of the connections between the measuring mechanisms which are located in the casing.

The means for actuating and adjusting the rotative magnet systems 2, 5, 7, 10 and 12 is shown in Figure 3. The rotative magnet system 2 is controlled by a gyroscopic turn indicator 20, which measures in a known manner the turning movements of the airplane about the vertical axis through precession about the axis 21. A contact arm 22 fast with the axis 21 and a fixed resistor 23 are bridged with the coil of the rotative magnet system 2. A source of current 24 supplies the necessary energy. During precession, the contact arm 22 slides over the resistor 23. This destroys the equilibrium of the bridge and a differential current begins to flow in the zero leg. This current causes a rotation of the coil of the rotative magnet 2 which is then transmitted to the reading pointer 3.

The rotative magnet system 5 is controlled by a course gyroscope 25 in a similar manner. A deviation of the airplane from its course entails a rotation of the gyroscope casing with respect to the gyroscope which remains in its direction. A contact arm 27, connected with the vertical axis 26, slides over a resistor 28, thus shifting the coil of the rotative magnet 5 which is bridged with the contact arm 27 and the resistor 28 and accordingly also the reading pointer 6. The base of the resistor 28 can be displaced through a worm 29 and a shaft 30 in function of a course transmitter 31. 32 is a source of current which supplies the bridge system with energy.

The actuation of both rotative magnet systems 7 and 10 is effected through an artificial horizon 34. The latter is formed of a gyroscopic system 35 suspended in a universal joint which is constantly maintained in the horizon through particular devices. The gyroscope 35 and its casing are journalled through the axis 36 for rotation in a ring 37 which in its turn is suspended on the bearings 39, 40 by means of the axis 38 which is perpendicular to the axis 36. Furthermore, the gyroscope 35 is pivotally connected by means of the axis 41 which is perpendicular to the axis 36 with a bail 42 provided with a stud 43 engaging a bail 44. The latter is suspended for rotation on the bearings 46, 47 by means of an axis 45 which is perpendicular to the axis 38. The bearings 39, 40, 46 and 47 are fast with the airplane. On the axis 38 or 45, a contact arm 48 or 49 respectively is provided which slides over a resistor 50 or 51 respectively. The contact arms 48, 49 respectively and the resistors 50, 51 respectively are bridged together with a source of current 52, 53 respectively with the coil of the rotative magnet systems 10 and 7 respectively.

The operation is as follows: It may be supposed that the arrow indicated in Figure 3 shows the direction of flight of the airplane. Since the gyroscope 35 is always directed horizontally, every turning movement of the airplane about its transverse axis will cause a rotation of the gyroscope about the axis 45 and, accordingly, through the contact arm 49, a displacement of the equilibrium of the bridge, which entails a displacement of the rotative magnet system 7. In a like manner, every movement of the airplane about its longitudinal axis will cause a rotation of the gyroscope about the axis 38 and, accordingly, through the contact arm 48, a displacement of the equilibrium of the bridge, which entails a displacement of the rotative magnet system 10. These displacements are transmitted to the reading pointers 8 and 11 which give the pilot an indication of the amplitude of these movements.

For determining the speed of flight, a wind wheel 55, a so-called air-log, is provided. It comprises a propeller 56 which drives a generator 58 through a shaft 57. The so produced voltage is proportional to the speed of the propeller and thus gives a measure for the speed of flight of the airplane. The air-log offers, with respect to a dynamic pressure gauge which, of course, can also be used, the advantage that its values are independent of the density of the air and, accordingly, true for any altitude. All this is true provided only that the air-log has no work to do, which can be obtained by giving the propeller sufficiently large dimensions, so that the work which is necessary for driving the generator is practically of no importance.

The rotative magnet system 12 is controlled by means of instrument 54 whereby forces proportional to the rate of turn and the direction of the rate of turn, and the speed of flight are combined to produce a force proportional to the product of said forces. The rotative magnet system 12 is adjusted according to this product so that the pointer 13 assumes a position dependent upon the product of air speed and rate of turn or $v\omega$. By maintaining the pointers 11 in coincidence with the pointers 13, a correct side inclination of the airplane is readily maintained by the pilot.

Means for combining the forces proportional to the air speed and rate of turn, respectively, are well known in the art and such well known means may be included within the casing of instrument 54. An example of such means is illustrated in the U. S. patent to E. Fischel, 2,137,974, dated November 22, 1938. Referring to Fig. 3 of said patent, electrical means are shown comprising a pair of coils producing a force which is proportional to the product of $v\omega$.

Referring to Fig. 3 of the present application, the leads of the speed responsive device 55 are conducted to the binding posts or terminals 60 and 61 and thereby induce in a coil within the instrument 54 an electrical force proportional to the speed, in generically the same manner as disclosed in said Fischel Patent 2,137,974. The leads from the rate of turn gyro 20 are conducted to the binding posts 62, 63, and 64, and thereby induce in a winding within the instrument 54 an electrical force proportional to the rate of turn and the direction of said turn. These electrical forces are thereby combined and make available at the binding posts 69, 70, and 71 an electrical force proportional to $v\omega$ which is applied to the magnet system 12.

While the rate of turn device 20 is suitable for small inclinations of the craft, with increasing inclinations, the indications thereof decrease as a cosine function of the angle of inclination. The product of air speed and rate of turn therefore, as produced by the device would decrease with increase of inclination. In order to correct this diminution means actuated by the horizon 34 are utilized to modify the combined action of the electrical forces proportional to the product of $v\omega$. As seen in Fig. 3, the contact arm 48 and resistor 50 are connected to terminals or binding posts 72, 73, and 74 whereby an electrical force is produced in a coil within the casing 54, which force is proportional to the inclination of a craft with respect to its longitudinal axis. With increased bank and consequent increased inclination, the electrical force so produced coacts with the force proportional to $v\omega$ to compensate for the decrease in said force by any means well known in the art such as those disclosed in Fig. 3 of said Fischel Patent 2,137,974 whereby forces proportional to the rate of turn, speed and inclination about the longitudinal axis are combined to thereby produce a force proportional to $v\omega$, which is compensated in proportion to the amount of inclination about the longitudinal axis of the craft. The force applied to the magnet system 12 is thereby varied accordingly.

With the arrangement according to the invention, it is easy for the pilot to give his airplane a correct side inclination. He has only to maintain the indication of the actual side inclination in coincidence with the indication of the required side inclination and to determine from time to time whether the ball level remains in its middle position for this condition. This gives also the possibility of checking the electrical indication through a mechanical indication for determining whether it is correct or not.

Thus, it results from the foregoing that high speed airplanes can be manually controlled in blind flight in a perfectly satisfactory manner by means of the slight surveying instrument according to the invention. It is also possible, of course, to transmit the values measured by the instrument to an automatic control device. An automatic control device constructed according to this principle can steer and turn a high speed airplane satisfactorily, since every course correction is aided by the required variation of side inclination.

What I claim is:

1. An indicating device for aircraft comprising a gyroscope responsive to inclination of the craft about its longitudinal axis, a dial, a pointer carrying two indicators disposed on diametrically opposite sides of the face of said dial operatively connected to said gyroscope and responsive to motion of said craft about its longitudinal axis, a second pointer carrying two indicators for synchronous movement in a given path substantially parallel to and adjacent the paths of said first two indicators, respectively, and means responsive to the product of factors respectively proportional to the speed of the craft and the rate of turn, modified by the instantaneous angle of bank for actuating said second pointer and indicators carried thereby.

2. An indicating device for aircraft comprising a gyroscope responsive to inclinations of the craft about its longitudinal axis, a dial, a pointer carrying two indicators disposed on diametrically opposite sides of the face of said dial operatively connected to said gyroscope and responsive to motion about the said longitudinal axis, a second pointer carrying two indicators for synchronous movement in a given path substantially parallel to and adjacent the paths of said first two indicators, respectively, and means responsive to the product of factors respectively proportional to the speed of the craft and the rate of turn of the craft for actuating said second pointer and the indicators carried thereby.

PAUL EDUARD KÖSTER.